United States Patent [19]
Gerber

[11] Patent Number: 5,966,226
[45] Date of Patent: *Oct. 12, 1999

[54] COMBAT COMMUNICATION SYSTEM

[75] Inventor: Peter Gerber, Berikon, Switzerland

[73] Assignee: Oerlikon-Contraves AG, Switzerland

[*] Notice: This patent is subject to a terminal disclaimer.

[21] Appl. No.: 08/731,365

[22] Filed: Oct. 11, 1996

[51] Int. Cl.$^6$ ................................................ G01S 13/78
[52] U.S. Cl. ............................................. 359/159; 342/45
[58] Field of Search ................................. 359/159, 169; 434/22, 21, 16; 342/45; 367/2; 356/4.01, 5.01, 141.1; 89/41.06; 364/411.1

[56] References Cited

U.S. PATENT DOCUMENTS

| | | | |
|---|---|---|---|
| 2,831,185 | 4/1958 | Goldbohm et al. | 343/6 |
| 4,194,201 | 3/1980 | Stein | 343/6.5 |
| 4,218,834 | 8/1980 | Robertsson | 455/609 |
| 4,342,556 | 8/1982 | Hasse | 434/22 |
| 4,837,575 | 6/1989 | Conner, Jr. | 342/45 |
| 4,995,101 | 2/1991 | Titterton et al. | 455/607 |
| 5,299,227 | 3/1994 | Rose | 375/200 |
| 5,426,295 | 6/1995 | Parikh et al. | 250/227.1 |
| 5,447,436 | 9/1995 | Campagnuolo et al. | 434/11 |
| 5,742,251 | 4/1998 | Gerber | 342/45 |

FOREIGN PATENT DOCUMENTS

| | | |
|---|---|---|
| 108643 | 5/1984 | European Pat. Off. . |
| 187086 | 7/1986 | European Pat. Off. . |
| 254197 | 1/1988 | European Pat. Off. . |
| 2659136 | 9/1991 | France . |
| 2215463 | 10/1973 | Germany . |
| 2251295 | 5/1974 | Germany . |
| 4003960 | 8/1990 | Germany . |
| 9414736 | 1/1995 | Germany . |
| 2216813 | 10/1989 | United Kingdom . |

*Primary Examiner*—Dang Ton
*Attorney, Agent, or Firm*—Ostrolenk, Faber, Gerb & Soffen, LLP

[57] ABSTRACT

The combat communication system is used for "identification friend or foe", firing simulation during practice, and/or combat aiming for live night shooting. Each participant wears a harness comprising light detectors and control units, as well as a laser assembly mounted to a weapon. For firing simulation or identification, a participant aims his weapon at a potential target and sends a laser signal. When the target is another participant wearing a harness, his harness answers via a radio, ultrasonic or light signal. The carrier frequency of the response signal can be determined and transmitted by the querying unit over the laser beam.

33 Claims, 6 Drawing Sheets

COMBAT COMMUNICATION SYSTEM

BACKGROUND OF THE INVENTION

1. Field of the Invention

The invention relates to an arrangement and a method for combat communication.

Such communication between soldiers in training and combat is of outmost importance. In particular, one way or two way communication is required for the operation of IFF (Identification Friend or Foe) and combat simulation systems.

2. Description of Related Art

A related communication system for combat simulation consists e.g. of laser emitters mounted on fire arms, which trigger light detectors on potential targets. The detectors triggered by the laser show the effects of a projectile from he respective fire arm.

In a known IFF system described in the European patent application EP 254 197 a laser signal and a radio signal are simultaneously sent to a potential target. Upon receiving these two signals, the target generates a response radio signal confirming its identity.

In other systems disclosed in the German patent applications DE 2 215 295 and DE 2 215 463 a modulated laser signal is used for querying a potential target, which then answers by radio or laser beam. A similar system is also used for animal identification and disclosed in the European patent application EP 108 643.

These known systems are difficult to operate and prone to undesired interferences between simultaneous communication operations.

SUMMARY OF THE INVENTION

Hence, it is a general object of the invention to provide an arrangement and method for combat communication suited for IFF and/or combat simulation that is simple and allows a safe and secure operation.

Now, in order to implement these and still further objects of the invention, which will become more readily apparent as the description proceeds, the arrangement for combat communication is manifested by the features that it comprises query units and response units, wherein each query unit comprises a laser emitter for emitting a query beam, a modulator for encoding query data in said query beam, and a signal receiver for receiving a response signal, and each response unit comprises at least one detector for receiving said query beam, at least one demodulator for decoding said query data, and a signal emitter with selectable emission carrier frequency for generating said response signal at said emission carrier frequency, wherein said emission carrier frequency is set by a frequency code in said query data.

The method for combat communication between a query unit and a response unit comprises the steps of determining a free carrier frequency in said query unit, sending an optical query beam from said query unit to said response unit and modulating said query beam to encode said free carrier frequency therein, receiving said query beam at said response unit and demodulating said query beam for determining said free carrier frequency, and generating a response signal in response to said query beam at said free carrier frequency.

In this aspect of the invention the laser beam from the query unit is modulated for transmitting a query signal that indicates the desired response carrier frequency. The query signal can also provide additional information, such as the identity and/or position of the query unit. By transmitting the desired response carrier frequency, it becomes possible to avoid interference between concurrent IFF operations. Furthermore, the security of the transmission is increased.

In another aspect of the invention the arrangement for combat communication is manifested by comprising query units and response units, wherein each query unit comprises a laser emitter for emitting a query beam, a modulator for encoding query data in said query beam and an ultrasound receiver for receiving an ultrasonic response signal, and each response unit comprises at least one detector for receiving said query beam, at least on demodulator for decoding said query beam and an ultrasound emitter for generating said response signal in response to said query beam.

An ultrasonic wave, i.e. a sound wave having a frequency above 20 kHz, is difficult to detect and avoids interferences with existing communication systems.

In yet another aspect of the invention the arrangement for combat communication is manifested by comprising query units and response units, wherein each query unit comprises a laser emitter for emitting a query beam, a modulator for encoding query data in said query beam and a light receiver for receiving a response signal, and each response unit comprises at least one detector for receiving said query beam, at least on demodulator for decoding said query beam and at least one diffusely emitting light source for generating said response signal in response to said query beam.

Using a diffuse light beam for the response signal has the advantage that the response unit does not need to know the location of the query unit. To optimize the range of such systems, the query unit is preferably equipped with an imaging optics aligned parallel to the laser emitter for imaging the response unit onto the light receiver.

The query and response units according to the present invention can be used for IFF as well as combat simulation. In both applications, the query unit first sends a modulated laser beam to the target. The modulated laser beam preferably encodes the desired response frequency. After having received the laser beam, the response unit preferably decodes the response frequency and sets the frequency of its signal transmitter to emits the response signal. The response signal may contain an identification code of the response unit (for IFF) and/or may identify which detector has been hit (for combat simulation).

Interferences between concurrent communication operations can further be reduced by providing the response unit with a random delay generator that determines a random delay before sending the response signal.

Preferably, the laser is operating at an infrared wavelength, especially a wavelength below 1000 nm (preferred is the near infrared at 780–905 nm) to avoid conflicts with optical range finders, the lasers of which are usually working at 1.5 $\mu$m or 905 nm. Also, it is found to be advantageous to use a continuous wave (cw) laser and to modulate the amplitude of its output power in single pulses (pulse modulation)—such a laser allows a more accurate modulation than the inherently pulsed semiconductor lasers operating at 1.5 $\mu$m, which are usually not cw lasers. The increased modulation quality allows to reduce the signal intensity while maintaining a good signal to noise ratio. This decreases the visibility of the signal beam in night vision systems, the requirements in laser power and the danger of eye injuries.

The query units can be equipped with a "friend-foe"—display for indicating if a valid response signal was received or not. In addition to the display or alternatively thereto, the result of the IFF operation can be displayed on suitable lamps (such as LEDs) and/or by an audible signal.

When using the system in combat simulation, each query unit can be provided with a plurality of detectors. The response signal can then carry information on the activated detector(s), which allows the query unit, which sent the laser beam, to determine the detector (and hence the part of the body) hit by the laser beam. This information can be displayed as a feedback for the requester's targeting skills.

Preferably, the laser is mounted to a fire arm and comprises a lever for actuation.

Furthermore, the laser emitter can be provided with divergent optics, which allows to adapt the laser beam to the target distance and/or the desired operation (IFF, combat simulation or aiming).

It must be clearly understood that the invention also refers to the individual components of the communication arrangement, such as its master control unit and its laser assembly, which can also be used independently from the system. In particular, the laser assembly can e.g. be used in simple combat simulation, targeting or support systems without the signal receivers and/or response units of the communication arrangement.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

A combat communication system as described below may use a combat harness as disclosed in U.S. Pat. No. 5,742,251, by the same inventor, and entitled "Combat Harness".

Figure 1:
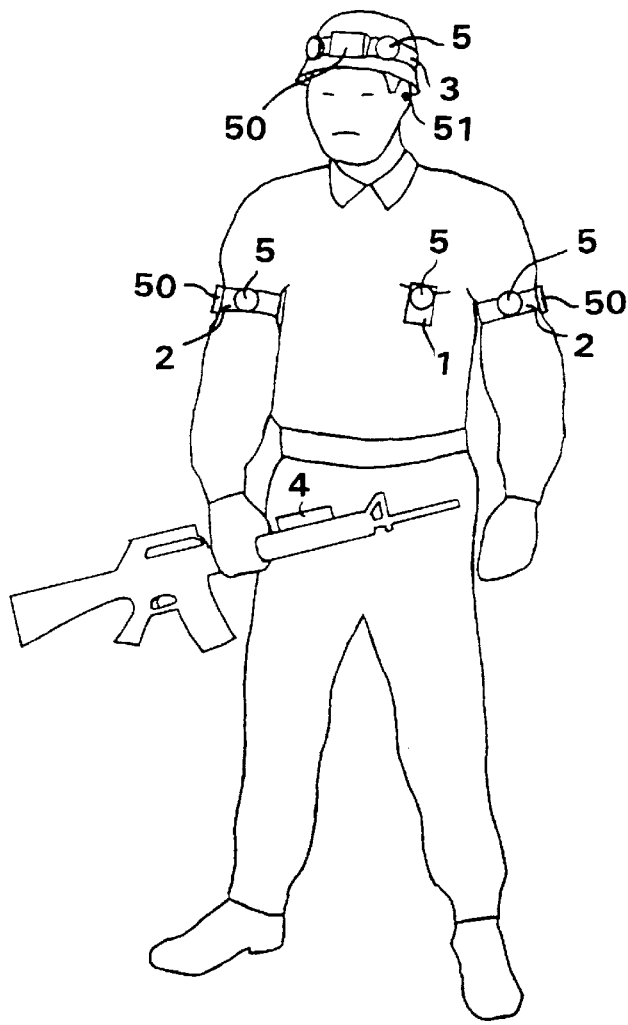
FIG. 1 shows a soldier carrying an embodiment of the IFF/simulation equipment according to the present invention.

The basic components of a harness set of a preferred embodiment of an IFF/simulation equipment are shown in FIG. 1. They are: A master control unit 1, two arm harnesses 2, a helmet harness 3 and a laser assembly 4. Master control unit 1, arm harnesses 2 and helmet harness 3 are each equipped with one or more light detectors 5 sensitive at the wavelength of the light emitted by the laser assembly 4. In the present embodiment, each arm harness 2 is equipped with two detectors arranged on opposite sides of the arm and a control circuit 50. Helmet harness 3 carries four detectors, each of which covers an area of at least 90 degrees, and a control circuit 50.

The mechanical design of laser assembly 4 is shown in FIGS. 2–5. It comprises a housing having a bottom part 8 and a lid part 9. A clamp 10 (not completely visible) is attached to the bottom side of the housing for clamping the housing onto a fire arm.

Laser assembly 4 further comprises a lever 11 being formed by a first member 12 and a second member 13 connected by a first hinge 14. This lever can be used for triggering the laser assembly, starting an IFF procedure, aiming, or releasing a simulated shot as will be described below. Lever 11 has a secure OFF position designated by numeral 16. In this OFF position, it rests against a lateral side of the housing 8, 9 and second member 13 is folded about first hinge 14 to rest inside U-shaped first member 12. For moving lever 11 into its ON position, first member 12 is pivoted outward as shown by arrow 17 about a second hinge 19 and second hinge member 13 is pivoted outward as shown by arrow 18 about first hinge 14. In this way, lever 11 can be brought into a first, inactive ON position 21. In this position, lever 11 extends downward from laser assembly 4. Edge surfaces of member 12 and 13 are abutting on each other thereby preventing further pivotal movement of second member 13 about first member 12. When pressing second member 13 towards the fire weapon along a direction indicated by arrow 22, the whole lever 11 is now pivoted about hinge 19 against the force of a spring (not shown) into an active ON position 16a where it actuates a micro-switch (not shown), thereby triggering the IFF and/or simulation procedures described below.

The lever 11 as shown here can be brought into a secure, compact OFF position where it does not interfere with the handling of the weapon. In its ON position, it can easily be reached by the user and be pressed for activation of the system. Lever 11 can be pivoted from its OFF to its ON position while laser assembly 4 is mounted to the weapon, which simplifies the handling of the device.

Figure 3:
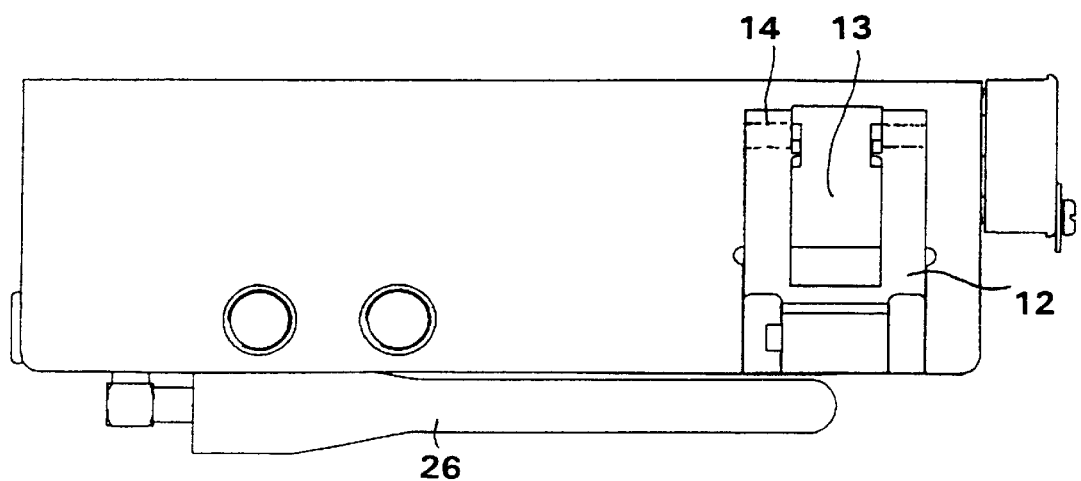
FIG. 3 is a side view of the laser assembly.
Figure 4:
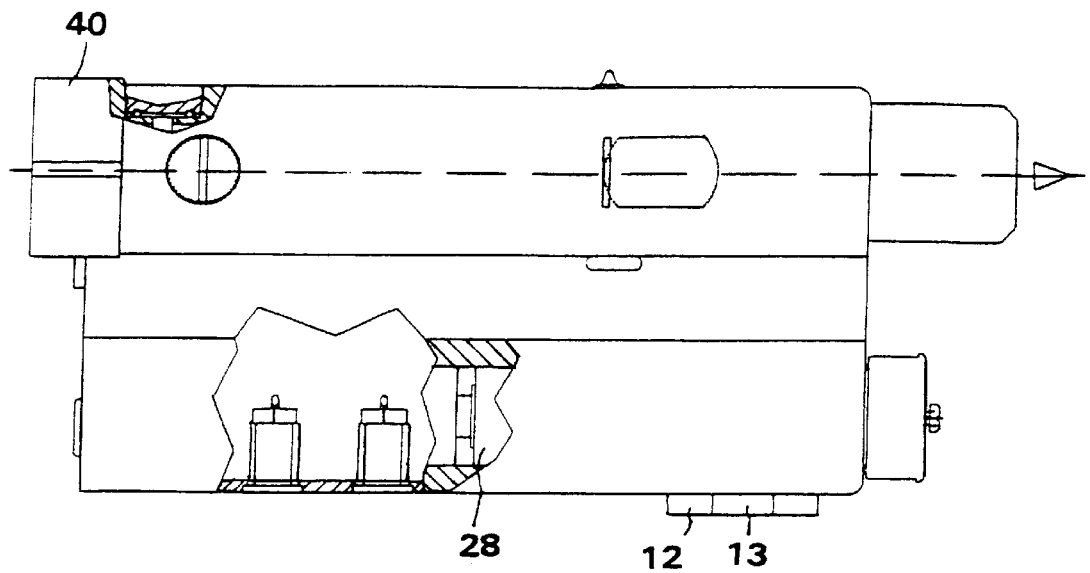
FIG. 4 is a top view of the laser assembly

Laser assembly 4 further comprises a signal receiver/emitter and laser driver circuit 25 (see FIG. 5), which is arranged in bottom part 8 of the housing, as well as an external antenna 26 (FIG. 3). The operation of these parts will be described below.

Upper part 9 of the housing forms two semi-cylindrical, parallel chambers, one for housing batteries 28 for powering a diode laser and the electronic circuitry, the other for housing a laser source and electronics. The recess formed between the chambers allows a free sighting of the target.

Figure 5:
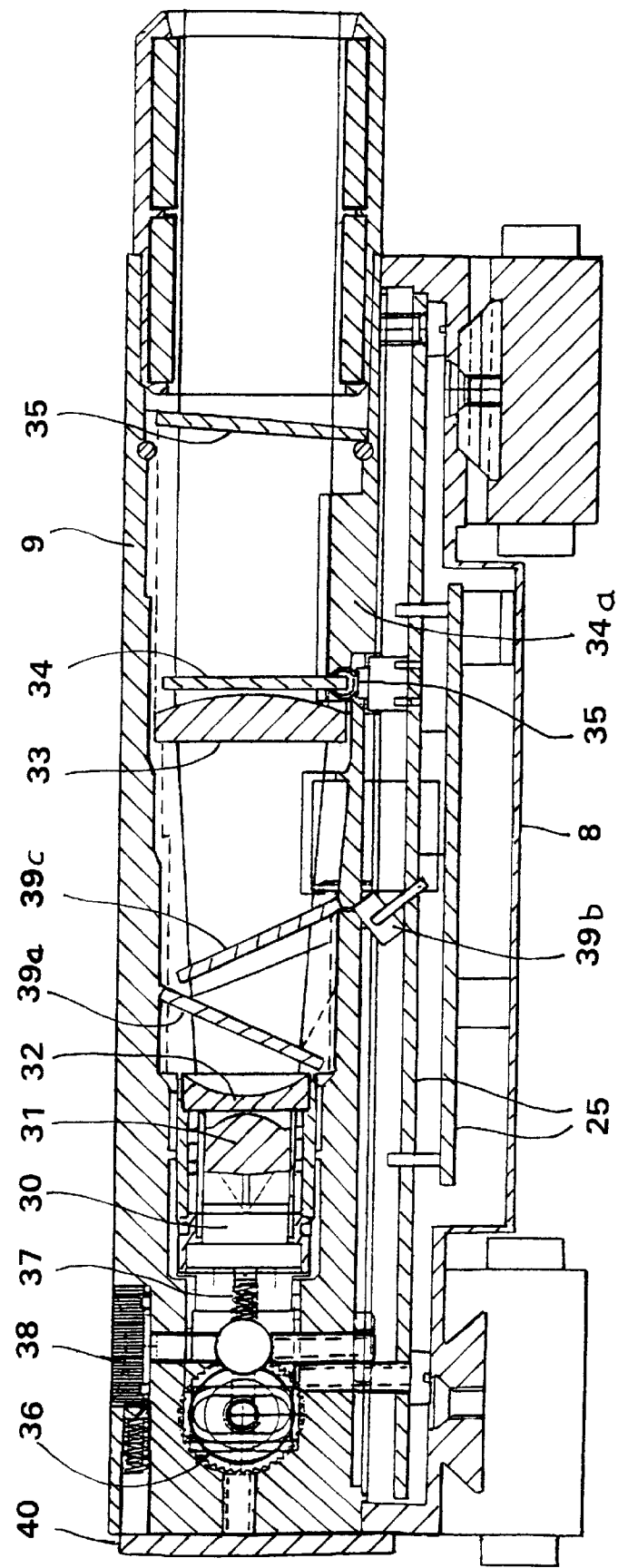
FIG. 5 is a sectional view along line V—V of FIG. 4.

The design of the laser source is shown in FIG. 5. It comprises a semiconductor laser 30, a collimation optics comprising lenses 31–33, a holographic grating 34 and an output window 35. The lenses are conventional components selected to produce a beam with a divergence of 0.2–0.5 mrad. Holographic grating 34 is pivotal about a hinge 35 by means of a knob arranged outside the housing 8, 9 (not shown). When it is moved to its horizontal position 34a, it does not affect the beam. When pivoted to its vertical position, it increases the divergence of the beam to 10 mrad.

Between lenses 32, 33, a beam splitter 39a is arranged for projecting light coming from the output side of the laser assembly into a detector 39b. A further plate 39c, arranged symmetrically to beam splitter 39a, compensates the beam offset introduced by beam splitter 39a. Beam splitter 39a and detector 39b are provided for detecting objects in the path of the light beam, such as dirt on window 35 or an obstacle (such as a leaf) in the exiting beam. Such objects reflect part of the laser light, thereby giving rise to a signal in detector 39b, and a warning issued to the user. Furthermore, detector 39b may be used for receiving a response signal as described below.

Semiconductor laser 30 is a cw (continuous wave) device operating at 820 nm or in any other wave length, preferably between 780–905 nm, and has an output power of e.g. 50 mW. When operating the laser source with the holographic grating 34, i.e. when the output beam has a divergence of 10 mrad, it has a range of approximately 2 km, while removing grating 34 and thereby decreasing divergence to 0.2 mrad extends the range to more than 10 km. When working at distances below 2 km, aiming with inserted grating is easier.

Using a laser in the near infrared, i.e. below 1000 nm has various advantages:

Semiconductor lasers at this wavelength can be operated in cw mode. They therefore can be modulated easily and accurately. This increases the signal to noise ratio of the output beam.

Conflicts with the lasers used in range finders (operating around 1.5 μm) are avoided. Devices for detecting the presence of range finders are not triggered.

It must be noted, however, that the invention can also be carried out with lasers (or other light sources) operating at any wavelength.

FIG. 5 shows that semiconductor laser 30 can be manipulated by adjustment screws 36–38 for alignment.

An LCD display 40 is arranged at the back wall of the lid part 9 of the housing. The function of this display is described in detail below.

Figure 6:
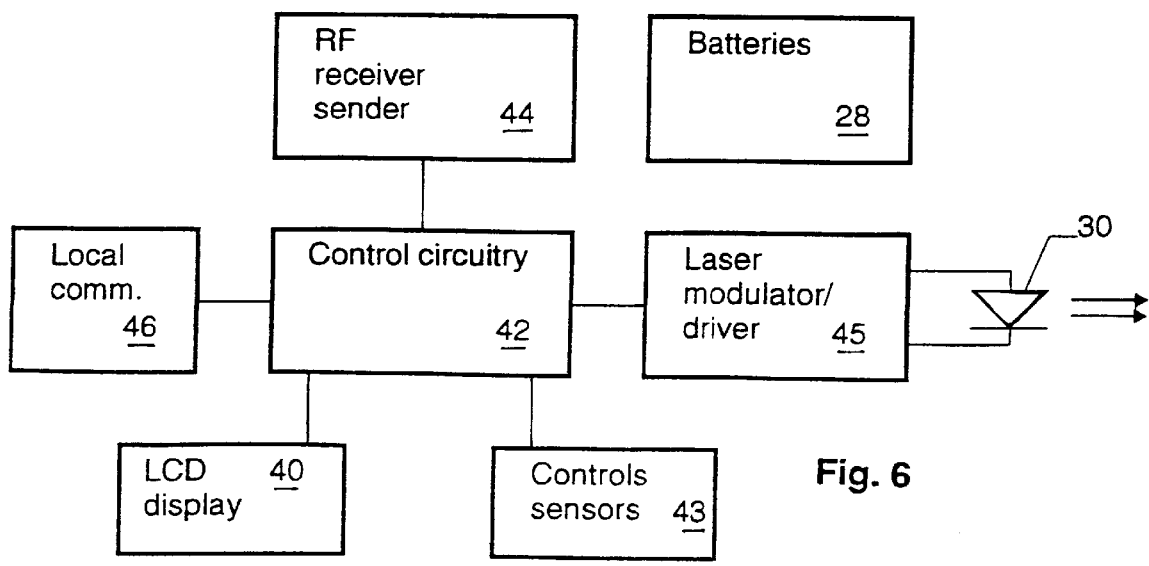
FIG. 6 is a block diagram of the laser assembly electronics of a first embodiment of the invention.

FIG. 6 is a block diagram of the electronics included in the laser assembly 4 of a first, presently preferred embodiment. It comprises control circuitry 42 connected to LCD display 40, controls and sensors 43 (including lever 11 and detector 39b), a radio receiver/sender 44, a modulator/driver 45 for laser diode 30, and a local communication port 46. All electronic circuits and devices are powered by the batteries 28.

Radio receiver/sender 44 is capable of receiving and sending digital messages and comprises suitable modulator and demodulator circuitry as known in the state of the art. The frequency, i.e. radio channel, of the receiver and the sender can be set by control circuitry 42. In the present embodiment, receiver/sender 44 is designed to send and receive messages on 16 different radio channels.

Local communication port 46 establishes and maintains the connection with master control unit 1, arm harnesses 2 and helmet harness 3. For these purposes, local communication port 46 is equipped with a suitable receiver and emitter for infrared, ultrasonic, induction, cable or radio communication. Similar communication ports are arranged on the individual harness elements 2, 3 and in master control unit 1.

Before describing the operation of the system, we briefly discuss the design of harness elements 2, 3 and master control unit 1.

Each harness element 2, 3 comprises a belt, the ends of which are releasably connected, e.g. by a buckle or Velcro fastenings (not shown). The belt carries one or more detectors 5 sensitive for the light emitted by laser assembly 4 as well as a control circuit 50. Each control circuit 50 comprises a local communication port similar to the communication port 46 of laser assembly 4. Furthermore, the user carries a master control unit 1, which is also equipped with a light detector 5 and a communication port.

In the present embodiment, the user is carrying separate harnesses on his arms and on the helmet, and master control unit 1 is clipped separately to his clothing. This arrangement makes it easier to put on and take off the harness even if the soldier is carrying a backpack or other equipment. It is, however, possible to combine arm harnesses 2 and master control unit 1 into a single body harness. Also, it is possible to add more detectors, e.g. to the legs, or to work with less detectors and/or harness parts.

Figure 7:
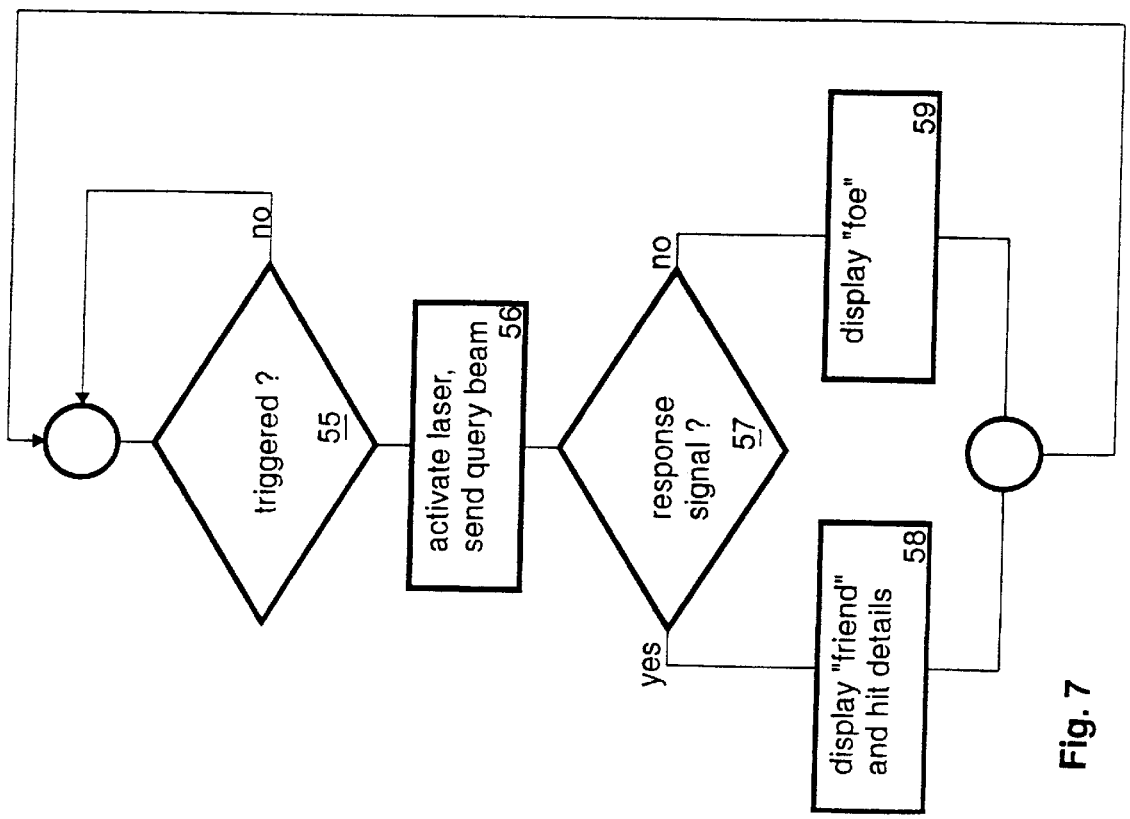
FIG. 7 is a flow chart showing the query operation.

In the following, we describe the basic operation of the system shown in FIGS. 1–6 by referring to the simplified flow charts of FIGS. 7 and 8.

For the following discussions, the equipment of the soldier issuing the laser beam is termed the "query unit", the equipment of the soldier receiving the laser beam is called the "response unit". However, it should be pointed out that in the present embodiment the equipment of each soldier contains all components of a query as well as a response unit, i.e. each soldier can query as well as be queried.

Figure 2:
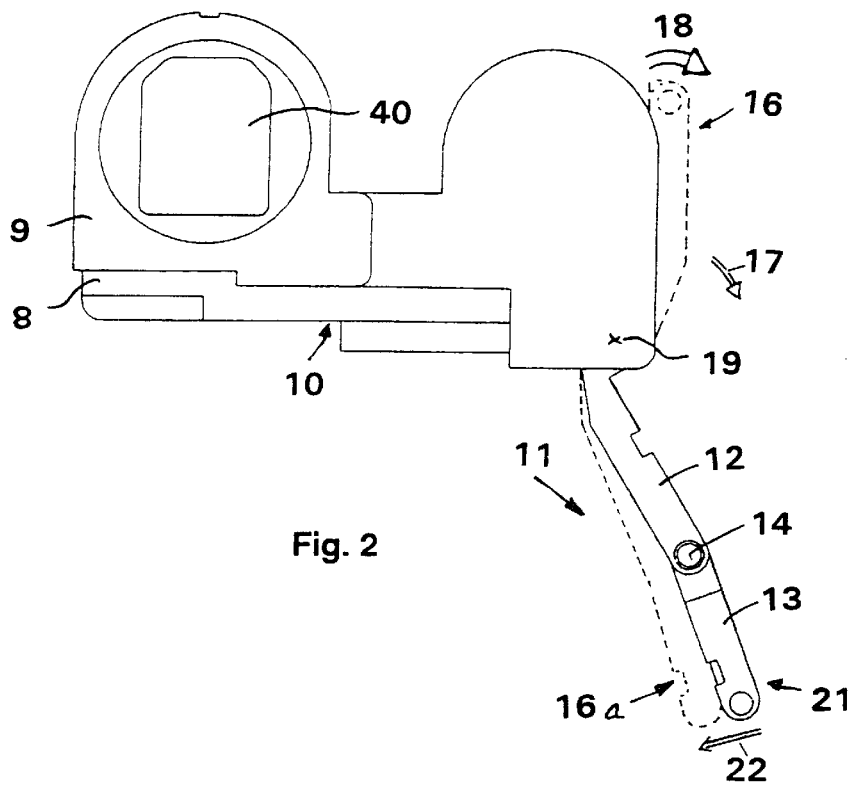
FIG. 2 is a rear view of the laser assembly mounted to the rifle of FIG. 1.

As mentioned above, the present system can be used for IFF, combat simulation and aiming. In IFF and combat simulation, the basic operation is the same. The soldier carrying the query unit first selects his potential target by aiming laser assembly 4 at it. Then he operates lever 11 by pushing it from its inactive to its active ON position 16a (FIG. 2). This is detected by control circuitry 42 of laser assembly 4, which continuously samples the state of lever 11, as shown in step 55 of FIG. 7. Once an actuation of lever 11 is monitored, laser diode 30 is activated and a query beam is emitted (step 56).

The query beam or query signal is pulse modulated to contain a binary message. This message includes the following query data:

frequency code: desired response channel identification code of the query unit soldier number (optional)

further data (optional)

The frequency code defines the desired response channel, i.e. the RF carrier frequency at which the response unit is expected to send its answer. For determining a suitable carrier frequency, the query unit continuously scans all available RF frequencies and keeps a list of the currently free channels. Before sending a query signal, the query unit selects one of these free channels as the desired response channel.

The identification code contains an identification of the interrogator, such as a unique ID attributed to each soldier's equipment as well as security information that allows the receiver to positively verify the identity of the interrogator.

Further data can e.g. include the position of the query unit, the type of the firing weapon, etc.

If the soldier's aiming was accurate, the query beam will hit the response unit, where it will be detected by one of the detectors 5.

Figure 8:
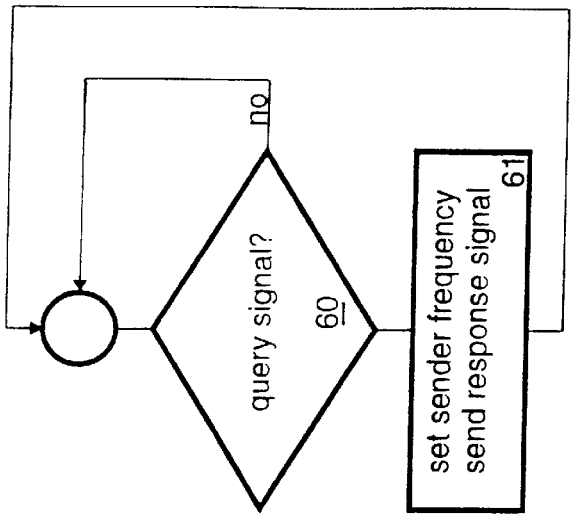
FIG. 8 is a flow chart of the response operation.

The response unit continuously scans its detectors for the presence of a query signal, as shown in step 60 of FIG. 8. Once it receives a query signal, it verifies its identification code and, if the identification is positive (i.e. if the query unit is found to have the authority to query the response unit), the response unit prepares an answer. It retrieves the desired response channel from the query signal, sets the carrier frequency of its radio transmitter 44 accordingly, and sends an RF response signal as shown in step 61.

The response signal contains the following response data:

identification code of the response unit information on the sensor(s) that detected the query signal (optional)

further data (optional)

The identification code is again a verifiable code that identifies the response unit.

The information on the sensor(s) that detected the query signal identifies which of the sensors of the response unit has (or have) detected the signal. This information is especially useful during combat simulation.

The further data can again include information about the position of the response unit or other pertinent data that might be useful during combat or simulation. It also can include information identifying the response unit.

When the response unit detects a query signal, it does not alert its owner, except in combat simulation, where this signal can be used to flag a hit. A soldier being hit is considered to be killed or wounded. When the response unit contains a plurality of detectors, e.g. on the soldier's chest, arms and head, the response unit can also display the detectors that were hit, thereby giving a more accurate indication of the simulated damage.

The query unit is meanwhile monitoring the desired response channel (step 57). If it receives the response signal within a given time after sending the query signal, it verifies the identity of the response unit, and, if the response unit is found to be a friendly unit, the query unit continues at step 58. It operates display 40 to show that the queried entity is a "friend". Otherwise, it continues at step 59 and displays the queried entity to be a "foe".

In addition to operating display 40 or alternatively thereto, the result of the IFF investigation can also be displayed on one or more LEDs or with an acoustic signal.

When the query unit receives a friendly response signal, it can send a confirmation signal through its laser beam to the response unit. This improves the system's reliability. If the response unit does not receive this confirmation signal, it can send the response signal again. Even though the use of such a confirmation signal is preferred, it is not required for proper operation, and the corresponding steps are not shown in FIGS. 7 and 8.

Since the query data and the response data are comparatively short, the query signal and the response signal can be short as well. Preferably, the response signals have a length in the order of some few milliseconds. Still, without further precautions, there would be a substantial probability of interferences between response signals when a single query signal hits several response units.

To avoid a message collision in this case, the response unit does not answer a query signal immediately but waits for a given delay time before activating its radio emitter. This delay time is chosen by a random number algorithm such that each response signal is sent at its own time. Before emitting the response signal, the response unit first tests if the desired response channel is free. If not, the response is delayed for an other random time period.

Figure 9:
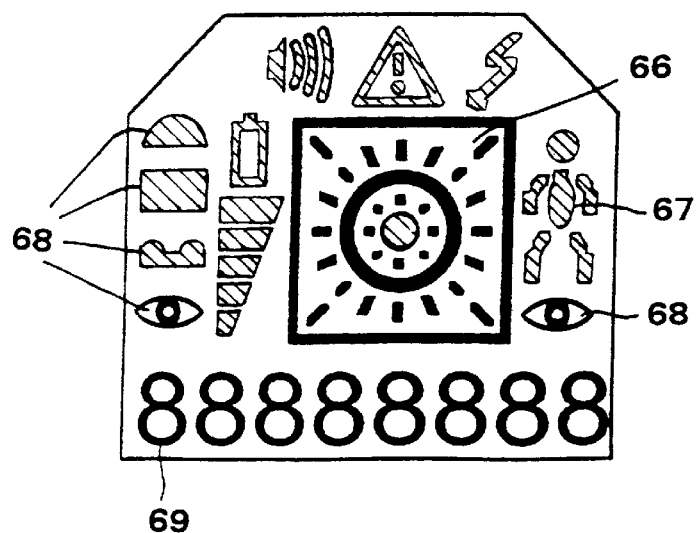
FIG. 9 shows a possible LCD display for the equipment.

FIG. 9 shows a possible design of a display 40. This display contains various indicators on the state of the system and shows the result of a query or simulation hit.

The result of the query is shown with a symbol 66. Parts of this symbol are switched on or off, depending on if the response unit is a friend or foe. Symbol 67 is a hit indicator. When the response unit indicated which of its sensors was hit, the corresponding part of the symbol on the query unit is switched off. This provides an immediate feedback showing the inquirer's aiming skills. A series of symbols 68 is provided to indicate the status of the sub-systems, such as the helmet harness 3, the arm harnesses 2, the laser harness 4 and the master control unit 1. Display 40 further comprises a numeric or alphanumeric section that can be used for providing feedback when inputting setup-information, such as the equipment's ID. For this purpose, master control unit 1 is provided with a numeric keypad (not shown).

While FIG. 1 shows a soldier having a complete harness set including a query unit as well as a response unit, it must be noted that some participants in combat or simulation may only carry a response unit or a query unit. Civilians can e.g. be equipped with a response unit only.

The laser assembly of the system shown here can be used for IFF, combat simulation and shooting as described above. In addition to this, it can be used as an aiming aid for aligning the weapon on a target, in which case the user has to wear a night vision aid in order to see the near infrared laser spot.

The laser beam can also be used for range finding and communication. For communication, master control unit 1 can e.g. be equipped with a suitable keyboard that allows the entry of one or more messages.

When using the present system, especially during combat simulation, a central stationary radio receiver can be used for monitoring the signals emitted by the response units and displaying all encounters and casualties, thereby providing an observation tool for combat command.

In addition to the components described so far, each harness set can further be equipped with an ear phone 51. Such an ear phone can e.g. emit a signal indicating if a given target was found to be a "friend" or "foe" during IFF.

When being used for IFF, the harness set should be provided with a mechanism that invalidates its function once it has been removed from its wearer. For this purpose, the harness set can e.g. be provided with sensors measuring humidity, temperature, pulse, vocal emissions or other parameters indicative of the proximity of a human body, or it can be provided with mechanical detectors indicating an opening of the harness fastenings, the master control unit's clip, etc. Once these sensors or detectors find that the harness (or parts of it) have been removed from its original wearer, the functions of the harness are disabled until a predefined access code is entered through the keypad of the master control unit.

In the embodiment shown so far, the response signal was an electromagnetic signal at radio frequencies. However, it is possible to use other type of response signals.

Figure 10:
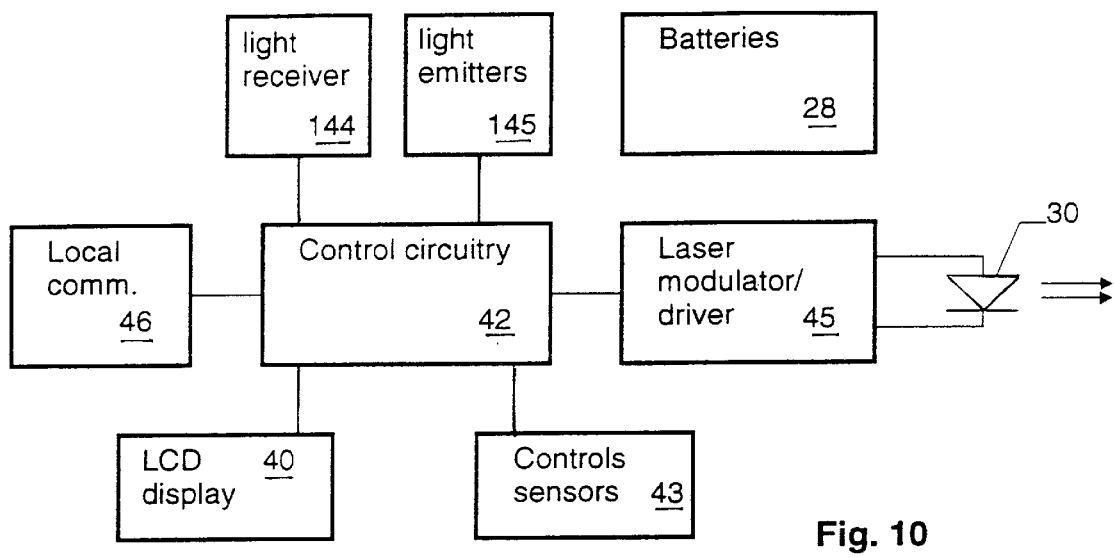
FIG. 10 is a block diagram of a second embodiment of the invention.

FIG. 10 shows a second embodiment of the invention. In contrast to the embodiment of FIG. 6, the second embodiment uses a light receiver 144 and light emitters 145 instead of the RF receiver/sender 44 for communication between query and response unit.

When a response unit receives the query signal, it operates the light emitters 145 for sending the response signal, e.g. in pulse modulation. The light emitters 145 can be one or more LEDs or other diffuse light sources arranged on any part of the response unit, e.g. on the helmet harness or in each light detector 5.

Light receiver 144 preferably comprises detector 39b (see FIG. 5). When laser assembly 4 is aimed at the response unit, lens 33 forms an imaging optics that images the response unit onto detector 39b such that it receives the signal from the light emitters 145.

Figure 11:
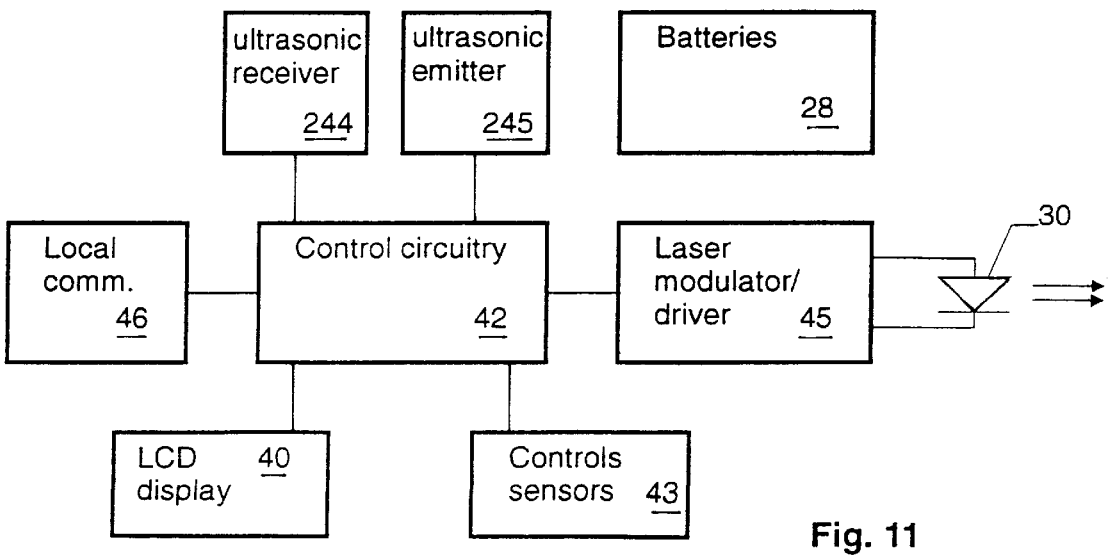
FIG. 11 is a block diagram of a third embodiment of the invention.

FIG. 11 shows a third embodiment of the invention, which uses one or more ultrasound emitters 245 and an ultrasound receiver 246 for communication between query and response unit.

When a response unit receives the query signal, it operates ultrasound emitter 245 for sending the response signal, e.g. in pulse modulation at 40 kHz. Ultrasound emitter 245 can be arranged on any part of the response unit.

Ultrasound receiver 244 has preferably anisotropic sensitivity and can e.g. be arranged on laser assembly 4 instead of antenna 26. It receives the signal generated by the ultrasound emitter 245 of the response unit and demodulates it.

In the embodiments of FIGS. 10 and 11, the response signal can also be transmitted at a carrier frequency. In the embodiment of FIG. 10, this carrier frequency can be the frequency of a periodic modulation of the individual pulses of light emitters 145. In the embodiment of FIG. 11, the carrier frequency can be the frequency of the ultrasonic signals emitted by emitter 245. The desired carrier frequency can be determined by receiver 144 or 244 of the query unit before sending the query signal, and then be transmitted to the response unit in the frequency code of the query signal as described for the first embodiment. To selectively receive a response signal at the given carrier frequency, receivers 144 and 244 of the query unit are provided with suitable filters. This again avoids interferences between concurrent communication operations.

While there are shown and described presently preferred embodiments of the invention, it is to be distinctly understood that the invention is not limited thereto but may be otherwise variously embodied and practiced within the scope of the following claims.

I claim:

1. An arrangement for combat communication comprising query units and response units, wherein
    each said query unit comprises a continuous wave laser emitter for emitting a query beam, a modulator for pulse modulating query data into said continuous wave laser query beam, and "a signal" receiver for receiving a response signal responsive to said encoded data,
    each said response unit comprises at least one detector adapted for receiving said pulse modulated continuous wave laser query beam, at least one demodulator for demodulating said query data, and a signal emitter which is capable of operating at various carrier frequencies and generating said response signal at said carrier frequency, wherein said carrier frequency is set by a frequency code in said query data.

2. The arrangement of claim 1 wherein said query unit comprises a control circuit connected to a receiver/sender designed to send and receive messages in a Plurality of frequencies, and wherein said query unit is adapted to determine a currently free frequency for generating said frequency code by continuously scanning said plurality of frequencies, storing a list of currently free frequencies of said plurality of frequencies, and, before sending said query signal, selecting one of said free frequencies as said carrier frequency.

3. The arrangement of claim 1 wherein each of said query units comprises a friend-foe-indicator responsive to said response signal.

4. The arrangement of claim 1 wherein each of said query units comprises a holder for mounting said laser emitter onto a fire arm.

5. The arrangement of claim 4 wherein each of said query units comprises a trigger for operating said laser emitter, wherein said trigger is mounted to said older.

6. The arrangement of claim 5 wherein said trigger comprises a lever having a substantially upward OFF position and a substantially downward ON position, said lever preferably comprising two members connected by a hinge.

7. The arrangement of claim 1 wherein said laser emitter comprises a divergent optics for selecting a divergence of said query beam.

8. The arrangement of claim 7 wherein said divergent optics comprises a holographic plate.

9. The arrangement of claim 7 wherein said divergent optics comprises a movable holder for selectably removing it from said query beam.

10. The arrangement of claim 1, further comprising a plurality of harness sets, each said harness set comprising one of said response units, wherein at least one of said harness sets comprise one of said query units and one of said laser emitters.

11. The arrangement of claim 10 wherein each harness set comprises a plurality of said detectors, wherein said response signal comprises information about the detector actuated by said query beam.

12. The arrangement of claim 11, wherein each of said query units comprises a display responsive to which of said detectors of a harness was actuated by said query signal.

13. The arrangement of claim 1 wherein said laser emitter is an infrared laser emitter.

14. The arrangement of claim 13 wherein said laser emitter emits light at a wavelength below 1000 nm.

15. The arrangement of claim 14 wherein said laser emitter emits light at a wavelength between 780 and 905 nm.

16. The arrangement of claim 1 wherein said continuous wave laser emitter is a continuous wave diode laser operated with pulse code modulation.

17. The arrangement of claim 1 wherein said laser emitter and said signal receiver are arranged in a common housing.

18. The arrangement of claim 1 wherein said query unit comprises a control circuit connected to a radio receiver/sender designed to send and receive messages on a plurality of radio (RF) frequencies, and wherein said query unit is adapted to select a free carrier frequency for generating said frequency code by each said query unit continuously scanning said plurality of RF frequencies, storing a list of currently free frequencies of said plurality of RF frequencies, and selecting one of said free frequencies as said carrier frequency.

19. The arrangement of claim 1 wherein said signal emitter is a light source, said signal receiver is a light detector and said response signal is a light signal modulated with said carrier frequency.

20. The arrangement of claim 1 wherein said signal emitter is a ultrasound source, said signal receiver is a ultrasound detector and said response signal is a ultrasonic wave at said carrier frequency.

21. The arrangement of claim 1, further comprising an attachment element for attaching at least one of said detectors to a person's arm.

22. The arrangement of claim 2 wherein said response unit is equipped with at least one disk shaped detector and said detectors are each sensitive to the wavelength of the continuous wave laser.

23. The arrangement of claim 2 wherein said laser emitter is configured to substantially modulate signals having a duration greater than 1 millisecond.

24. The arrangement of claim 19 wherein said light source for generating said response signal in response to said query beam is a diffusely emitting light source, and said query comprises imaging optics aligned with said laser emitter for imaging said response unit onto said light receiver.

25. A method for combat communication between a query unit and a response unit, each of said units being capable of sending/receiving at a plurality of frequencies, comprising the steps of:
    determining a free carrier frequency by said query unit continuously scanning said plurality of frequencies and storing a list of the currently free frequencies of said plurality of frequencies, and, before sending a query signal, selecting one of said free frequencies as a desired carrier frequency, sending an optical continuous wave query beam from said query unit to said response unit and pulse modulating said continuous wave query beam, to obtain an encoded binary message including the following query data:
a frequency code for a desired response channel carrier frequency,
an identification code of said query unit, wherein said response unit is fastened on a portable piece of equipment of a person participating in a real or simulated combat, receiving said modulated continuous wave query beam at said response unit and demodulating said modulated continuous wave query beam to determine said desired carrier frequency, and generating a response signal in response to said query beam at said demodulated desired carrier frequency.

26. The method of claim 25 further comprising the step of delaying the generation of said response signal after receiving said query beam by a random time.

27. The method of claim 25 further comprising the step of adding an identification code identifying said response unit to said response signal.

28. The method of claim 25 wherein said response signal is a radio signal.

29. The method of claim 25 wherein said response signal is an ultrasound signal.

30. The method of claim 25 wherein said response signal is a light signal.

31. An assembly for being mounted onto a portable fire weapon comprising,
a housing which forms a first chamber for housing batteries to power a diode laser and electronic circuitry and a second chamber for housing a laser source and additional electronics, wherein said first and second chambers extend parallel and form a recess therebetween to allow a free sighting of the target,
said housing having a bottom side with an attaching element for attaching said housing to said portable fire weapon,
a laser source arranged in said housing and capable of emitting a modulated continuous wave light beam along a longitudinal direction,
said housing having a lateral side and an upper side; and
a lever switch pivotally connected to said housing and having an OFF position in which said lever switch is positioned adjacent to said lateral or upper side of said housing, and an ON position in which said lever switch extends downward from said housing.

32. The assembly of claim 31 wherein said lever comprises a first member pivotally connected to said housing and a second member pivotally connected to said first member, wherein in said ON position said second member can be pivoted to increase the length of said lever.

33. The arrangement of claim 1, further comprising a respective affixation element for fixing each said response unit on a portable piece of equipment of a person participating in a real or simulated combat.

* * * * *